UNITED STATES PATENT OFFICE.

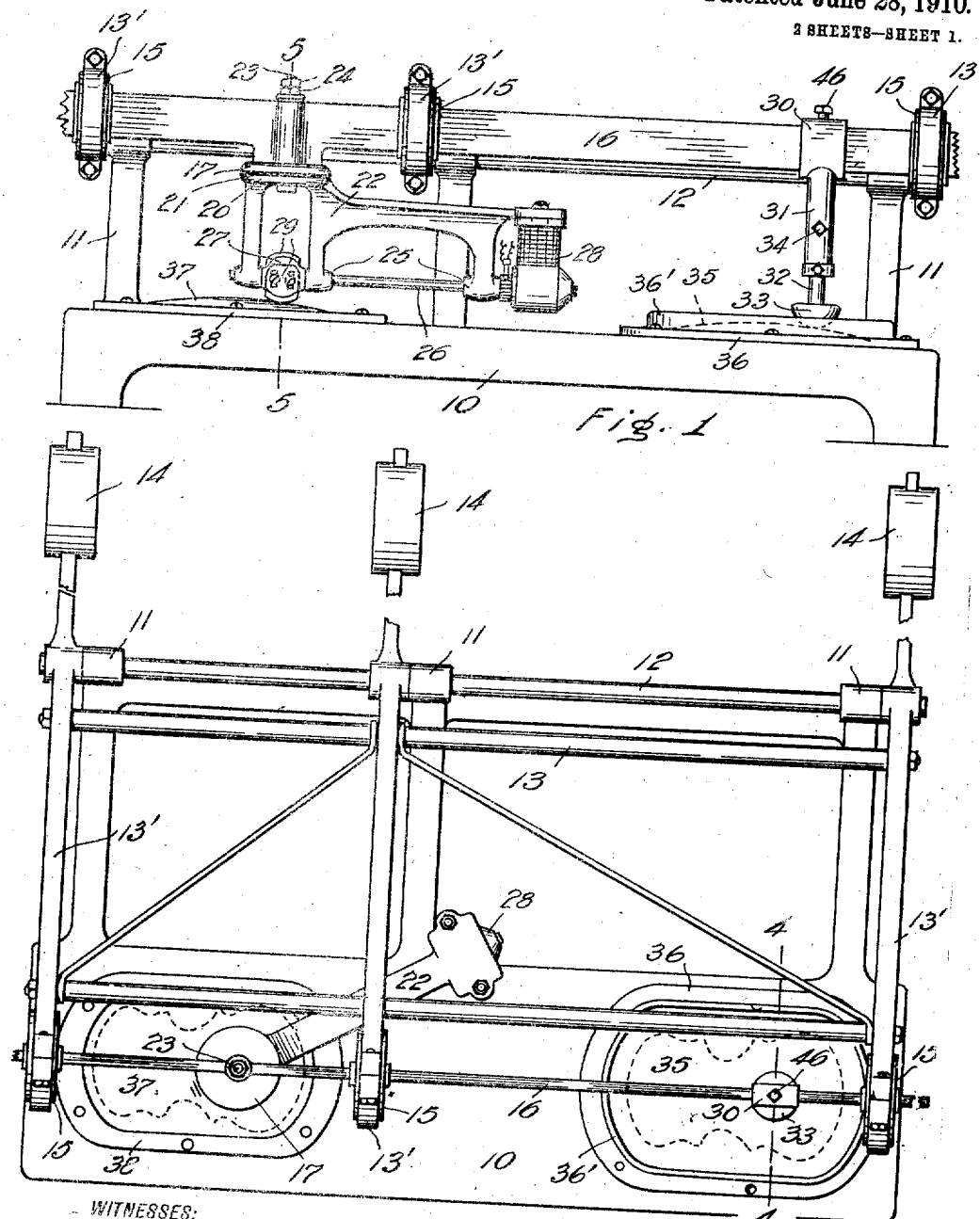

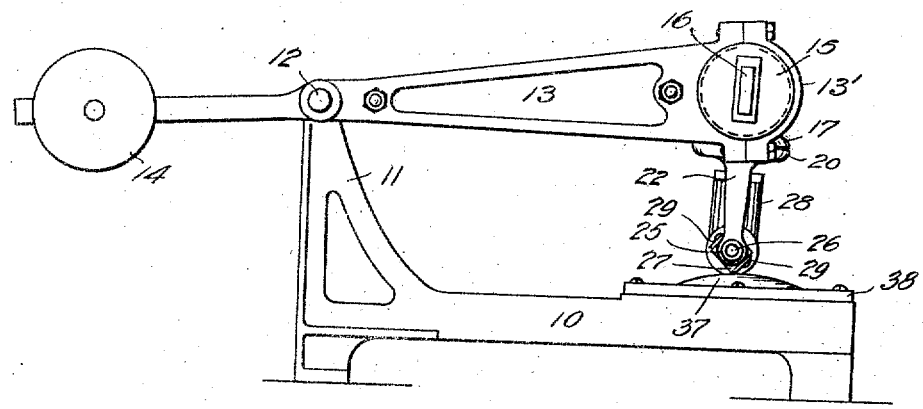

OLAUS JENSEN, OF SEATTLE, WASHINGTON.

DUPLICATE-SHAPING MACHINE.

962,573.  Specification of Letters Patent.  Patented June 28, 1910.

Application filed August 20, 1909. Serial No. 513,727.

*To all whom it may concern:*

Be it known that I, OLAUS JENSEN, a citizen of the United States, residing at Seattle, in the county of King and State of Washington, have invented certain new and useful Improvements in Duplicate-Shaping Machines, of which the following is a specification.

The object of this invention is the improvement in machines for duplicating irregular shapes through the employment of a cutting tool operating on a blank, working in conjunction with a guide which traverses a model.

A further object of the invention is to adapt said cutting tool so that in chipping the blank it may be regulated to remove the chips in any direction to accommodate the machine to the grain of fibrous material.

A still further object is to provide means whereby scope of the guide's travel is regulated.

The invention consists in the novel construction and combination of parts, as will be hereinafter described and claimed.

In the accompanying drawings, Figure 1 is a front elevation of a machine embodying my invention. Fig. 2 is a plan view of the same. Fig. 3 is an end elevation thereof. Fig. 4 is a cross sectional view taken through 4—4 of Fig. 2. Fig. 5 is a similar view taken through 5—5 of Fig. 1.

The reference numeral 10 designates the base of the machine frame and is provided at the rear with standards 11 which support a transversely arranged oscillatory shaft 12. A frame 13 is secured to said shaft so that its front end is free to swing up or down and is provided to the rear of the shaft 12 with counterweights 14, or an equivalent, to nearly balance the aggregate weights of the frame to the front of its pivotal connection and parts sustained thereby. In the forward portions of the respective members 13' of such swingable frame is a plurality of rotary disks 15 which are disposed to have their axes in alinement with each other and in parallel with the axis of the shaft 12. Fitted for endwise movement in said disks and axially thereof is a transversely arranged bar 16. Formed integral with, or rigidly connected with the bar 16 is a depending circular plate 17 having in its lower face an annular groove 18, Fig. 5, corresponding with an opposing groove 19 in the upper face of a companion plate 20. Balls 21 positioned in said grooves coact with the plates to serve as antifriction bearings and facilitate the rotary movements of the frame 22 which includes the plate 20.

The last mentioned frame 22 is suspended by a bolt 23 extending axially through said plates and also through said bar and is adjustably secured to the latter by the bolt-nuts 24 which are superposed upon the bar. The frame 22 is provided with journal bearings 25 for the arbor 26 of a cutter head 27 whose axis of rotation is perpendicular to that of the axis of rotation of frame 22. Said cutter head is disposed symmetrically with respect to the axis of rotation of the frame 22. As illustrated, said arbor serves as the armature shaft of an electric motor 28 which is fixedly secured to frame 22 though, if desired, intermediate connections may be had between the motor and the arbor instead of having the latter directly driven, as shown. The motor is located, however, so that it will not interfere with the material being operated upon by the cutting knives 29 carried by said head.

Adjustable lengthwise upon the bar is a sleeve 30 which has a depending tubular arm 31, Fig. 4, to serve as the socket for the shank 32 of a guide element 33 and which is secured in adjusted position by a set screw 34 extending through a threaded aperture in the arm 31. The configuration of the guide corresponds with the effective cutting edges of the knives 29.

35 represents a model, or pattern, which may be of metal and is desirably secured to the machine base 10 by a clamping member 36 which is characterized by having an upwardly extending flange 36' whose office is to prevent the movement of the guide 33 outside of the area inclosed thereby. This function of the invention will be understood from an inspection of Fig. 4 where the guide is shown in an extreme position by broken lines 33ª.

37 represents the work which is desirably secured to the machine base by a clamping member 38 having an interior opening of such dimensions that the cutter knives will not encounter the member when the cutter head has been moved to its maximum extent as controlled by the movements of the guide when limited by the aforesaid flange 36' of the member 36.

A wire 39, indicated by broken lines in Fig. 5, is, upon occasion, inserted through an aperture 40 in the cutter head and has its upper end introduced within a recess 41 provided in the end of the bolt 23, while the lower end of the wire affords a pointer which by a proper swinging of the frame 13 and bar 16 may be brought to marks inscribed on the work.

In the guide 33, see Fig. 4, there is a cavity 42 extending up into the shank 32 for the accommodation of a pin 43 which is connected to a finger 44 protruding from a slot in said shank and whereby the pin may be moved outwardly from the underside of the guide and in opposition to a spring 45 which normally retains the pin 43 in sheathed condition. The wire 39 and pin 43 are used for locating the relative positions of the pattern and work from correspondingly disposed marks upon the respective parts and which, if found to be out of register with the wire and pin, can be brought into such correspondence by shifting either the pattern or the work. Rather than disturb the pattern or the work it is usually more convenient to adjust the sleeve 30 upon the bar 16 which may readily be done after loosening a set screw 46 which is provided to fasten the sleeve in place. The extension of the guide with respect to the bar and relative to the cutter head is accomplished by adjustably moving the shank 32 in its socket.

The operation of the invention is as follows: The operator by grasping the arm 31 in his right hand directs and actuates the guide 33 to cause it to pass over the surface of the pattern and against which it is pressed by the unbalanced weight of the frame 13. In passing over such surface the bar 16 is rocked to swing the arm 31 to and fro and is likewise moved longitudinally to enable the guide to reach the extreme ends of the pattern. Meanwhile the cutter or cutter head 27, which is rotated by the motor at a high velocity, is caused by its connection with the bar 16 to partake of the various movements of the guide. Consequently, all of the material from the work 37 over a surface of the latter like that of the pattern is removed from the work through the instrumentality of the cutter. During the progress of the operation, the operator with his left hand swings the frame 22 so that the cutting tool is at all times presented to the work in such a manner that it is cutting with the grain, or nearly so, of the material and thus obviate the danger of tearing the same and producing a finished surface upon the work.

Relative to the machine the guide has three motions: vertical, with the swinging of the frame 13; transverse, with the lengthwise movements of the bar 16; and longitudinal, through the conjoint actions of the swinging frame 13 and the rocking of the bar 16. All of these motions are concurrently transmitted to the tool, or cutter head, which has, additionally, an independent rotary motion about the axis of the swivel connection of its frame 22 with the bar 16. By the provision of the flange 36' about the pattern to confine the range of travel of the guide, the entire attention of the operator may be directed to the work.

Having described my invention, what I claim as new and desire to secure by Letters-Patent, is—

1. In a shaper of the class described, a longitudinally movable and rotatable bar, a frame connected for rotation to the bar, a cutter carried by the frame, means supported by the frame for rotating the cutter, a pattern, and devices coöperating with the pattern for directing the movements of the bar whereby the cutter will be affected to afford a duplication of the pattern upon a blank.

2. In a shaper of the class described, the combination with the machine frame, a vertically swingable frame, supported by the machine frame, a bar carried by the second named frame and arranged for both rotary and sliding movements, a pattern secured to the machine frame, means for securing the blank work to the machine frame, a cutter, a cutter suspension means depending from the bar, means carried by the suspension means for imparting rotary motion to the cutter, and a guide carried by the bar and adapted to coact with the pattern to direct the movements of the bar and second named frame so that said cutter will partake of movements suitable to form the blank into an exact resemblance to the pattern.

3. In a shaper of the class described, the combination of the machine frame, another frame, a bar carried by the second named frame and arranged for both rotary and longitudinal movements therein, a third frame suspended from said bar and arranged for rotation about the axis of the suspending element, an arbor journaled in the last mentioned frame, and perpendicular with respect to the axis of rotation of such frame, power devices for driving the arbor, a guide carried by said bar, a pattern and means for detachably securing a blank to the machine frame.

4. In a shaper of the class described, the combination of the machine frame, a second frame connected for oscillatory movement with the machine frame, a bar carried by the second named frame and arranged for both rotary and longitudinal movements therein, a third frame suspended from said bar and arranged for rotation about the axis of the suspending element, an arbor journaled in the last mentioned frame, and perpendicular with respect to the axis of rotation of such frame, power devices for driving the arbor, a guide carried by said bar, a pattern, and means for securing a blank to the machine frame.

5. In a shaper of the class described, the combination of the machine frame, a horizontal shaft journaled therein, a frame mounted for vertical oscillation upon the shaft, a bar carried by the second named frame and arranged for both rotary and longitudinal movements therein, a third frame suspended from said bar and arranged for rotation about the axis of the suspending element, anti-friction bearings intermediate the third frame and said bar, an arbor journaled in the last named frame and perpendicular with respect to the axis of rotation of such frame, power devices for driving the arbor, a guide carried by said bar, a pattern, and means for securing a blank to the machine frame.

6. In a shaper of the class described, the combination of the machine frame, a second frame connected for oscillatory movement with the machine frame, rotary disks carried by the second frame, a bar extending through said disks and arranged to be moved axially therethrough, a third frame suspended from said bar and arranged for rotation about the axis of the suspending element, an arbor journaled in the last mentioned frame and perpendicular with respect to the axis of rotation of such frame, power devices for driving the arbor, a guide carried by said bar, a pattern, means for securing said pattern to the machine frame, and means for detachably securing a blank to the machine frame.

7. In a shaper of the class described, the combination of the machine frame, a horizontal shaft journaled therein, a frame mounted for vertical oscillation upon the shaft, rotary disks carried by the second frame, a bar extending through said disks and arranged to be moved axially therethrough, a third frame suspended from said bar and arranged for rotation about the axis of the suspending element, anti-friction bearings intermediate the third frame and said bar, an arbor journaled in the last mentioned frame, and perpendicular with respect to the axis of rotation of such frame, power devices for driving the arbor, a guide carried by said bar, a pattern, means for securing said pattern to the machine frame, and means for securing the blank to the machine frame.

8. In a shaper of the class described, the combination of the machine frame, a second frame connected for oscillatory movement with the machine frame, a bar carried by the second named frame and arranged for both rotary and longitudinal movements therein, a third frame suspended from said bar and arranged for rotation about the axis of the suspending element, anti-friction bearings intermediate the third frame and said bar, an arbor journaled in the last mentioned frame, and perpendicular with respect to the axis of rotation of such frame, power devices for driving the arbor, a guide carried by said bar, a pattern, means provided with an upstanding flange for securing said pattern to the machine frame, and means for securing a blank to the machine frame.

OLAUS JENSEN.

Witnesses:
PIERRE BARNES,
H. BARNES.